Sept. 29, 1970          G. E. HOLZ          3,531,685

GAS DISCHARGE STORAGE AND DISPLAY MATRIX

Filed Sept. 29, 1967          2 Sheets-Sheet 1

INVENTOR.
GEORGE E. HOLZ

BY Robert C. Green

ATTORNEY

Sept. 29, 1970          G. E. HOLZ          3,531,685
           GAS DISCHARGE STORAGE AND DISPLAY MATRIX
Filed Sept. 29, 1967                         2 Sheets-Sheet 2

INVENTOR.
GEORGE E. HOLZ
BY Robert A. Green
ATTORNEY

United States Patent Office 3,531,685
Patented Sept. 29, 1970

3,531,685
GAS DISCHARGE STORAGE AND DISPLAY MATRIX
George E. Holz, North Plainfield, N.J., assignor to Burroughs Corporation, Detroit, Mich., a corporation of Michigan
Filed Sept. 29, 1967, Ser. No. 672,682
Int. Cl. G11c *11/28;* H01j *65/04;* H05b *41/02*
U.S. Cl. 315—169                              6 Claims

ABSTRACT OF THE DISCLOSURE

A cell formed of insulating material and comprising a side wall and end walls and containing an ionizable gas which can be caused to produce visible light output when properly energized by an electrical potential applied between electrodes on the end walls of the cell. The gas is such that the energized state is maintained or stored after the energizing signal is removed, and it may be sustained by the intermittent application of an appropriate electrical signal which may be smaller than the initial energizing signal. The cell of the invention includes more than one group of electrodes, between each of which a distinct localized glow may be generated, and these distinct portions of each cell can be used to store intelligence or to register intelligence separately.

BACKGROUND OF THE INVENTION

The present invention relates generally to gas discharge devices of the type comprising a container which includes a quantity of ionizable gas which can be caused to glow by the application of suitable electrical potentials. It is known that devices of this type can exhibit memory, if the gas is properly selected, due to the formation of wall charges in the cell. Up to the present time, cells of this general type have been operated as individual units, and each has performed, in effect, a single function.

SUMMARY OF THE INVENTION

Briefly, a device embodying the present invention comprises a gas-filled cell having end walls for receiving electrodes for applying energizing potentials across the gas. A plurality of groups of such electrodes are provided so that, in effect, the single cell is divided into several distinct operating portions.

DESCRIPTION OF THE PREFERRED EMBODIMENTS

Figure 1:
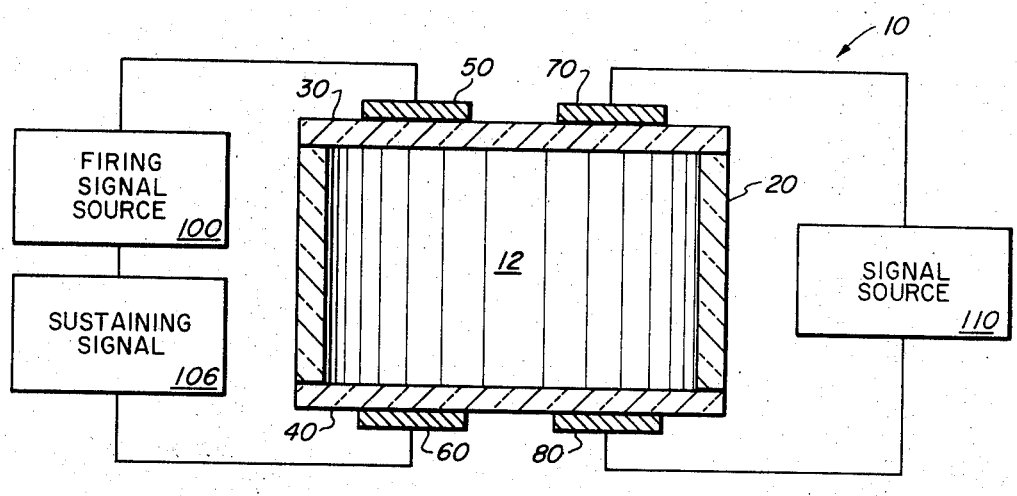
FIG. 1 is a sectional elevational view of one embodiment of the invention and a schematic representation of a circuit in which it may be operated.

Apparatus 10 embodying the invention comprises a cell formed of insulating material such as glass and including a hollow cylindrical envelope 20 having end walls 30 and 40, the cylindrical envelope and the end walls being made of glass. The end walls 30 and 40 form a gas-tight seal with the cylindrical envelope 20. According to the invention, a first pair of transparent electrodes 50 and 60 are secured opposite each other on end walls 30 and 40, respectively. A similar pair of transparent electrodes 70 and 80 are secured to the disks 30 and 40, respectively, opposite each other and spaced a suitable distance from the electrodes 50 and 60.

The cell 20 is filled with a quantity of a gas of the type which can be fired and can produce and store a visual light output when a suitable potential is applied to it. A suitable gas or mixture of gases can be selected from the group including neon, argon, nitrogen, etc. A mixture of about 94% neon and about 6% nitrogen at a pressure of a few hundred mm. Hg is particularly suitable. The gas may be introduced into the cell in any suitable fashion, for example, through a hole in one of the end walls which is sealed after the gas has been introduced.

The cell 20 with this gas filling has "memory," that is, the glow, once initiated by a firing signal, can be sustained by a smaller intermittent signal. This phenomenon appears to be due to charges stored on the wall of the envelope in the gas.

In one mode of operation of the device 10, a first firing signal source 100 and a sustaining signal source 106 in series are connected between electrodes 50 and 60. The firing signal source 100 may produce pulses of about 100 volts, and the sustaining signal source 106 may produce, for example, an A.C. signal of 500 volts RMS. The cell 10 is of such a size and the electrodes are so positioned that, when energizing and sustaining signals from source 100 are applied, the gas glows in a localized region between electrodes 50 and 60. Due to photon or electron coupling, wall charges are formed on the end walls 30 and 40 between electrodes 70 and 80 so that, in effect, this region of the cell is primed. If, at the same time, a second firing signal is applied from source 110 between electrodes 70 and 80, this portion of the cell is fired and glows. The second firing voltage from source 110 can be smaller than the first from sources 100 and 106 because of the photon coupling effect. This glow can be sustained as above by means of a sustaining signal produced by source 110 or by an auxiliary source.

In operation of device 10, several different combinations of operation and glow can be achieved; for example, glow may be produced between electrodes 50 and 60 to represent the registering of intelligence. This glow may be extinguished and renewed at intervals. The same operation may be performed with glow between electrodes 70 and 80. In another mode of operation, glow may be established between electrodes 50 and 60 to represent a first condition, and then glow may be established between electrodes 70 and 80 to represent a second subsequent step having a certain representation or meaning.

Figure 2:
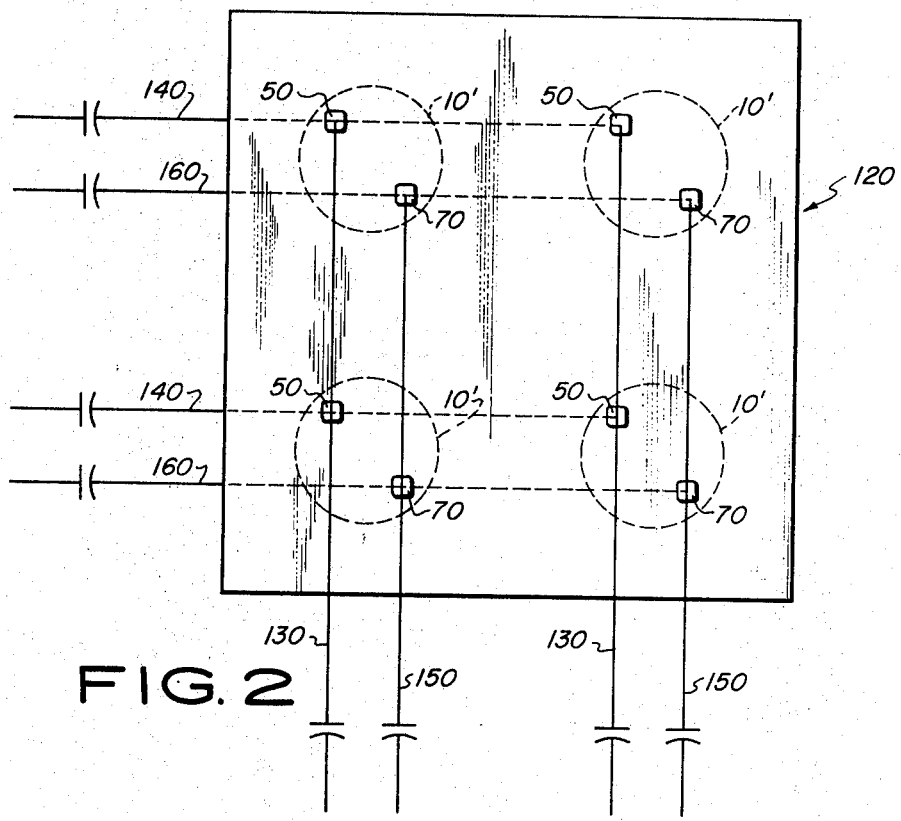
FIG. 2 is a plan view of a modification of the invention.

The latter mode of operation may be particularly useful in a device 120 (FIG. 2) which includes a plurality of cells 10', each having pairs of electrodes 50, 60 (not shown) and 70, 80 (not shown) with the electrodes 50 in each column connected by a common conductor 130, the electrodes 60 connected by a common conductor 140, electrodes 70 connected by a common conductor 150, and the electrodes 80 connected by a common conductor 160. Such a device can be used as an information storage and readout matrix, with any combination of ignition steps being used to represent the addressing or storing of information with subsequent readout of information.

Figure 3:
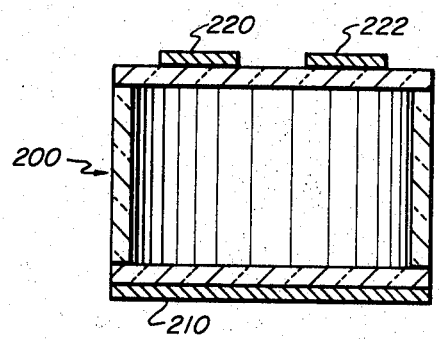
FIG. 3 is a sectional elevational view of another modification of the invention.

In a modification of the invention, a cell 200 (FIG. 3) includes a single large-area electrode 210 on one end wall and two spaced-apart electrodes 220 and 222 on the opposite end wall. The electrodes 220 and 222 can be combined with the opposite large-area electrode 210 to perform any of the combination of operations described above.

Figure 4:
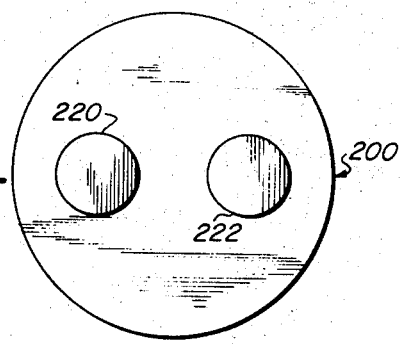
FIG. 4 is a plan view of an embodiment of the invention showing one electrode arrangement.
Figure 5:
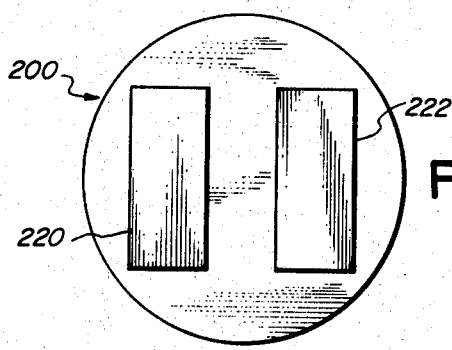
FIG. 5 is similar to FIG. 4 and shows another electrode arrangement.
Figure 6:
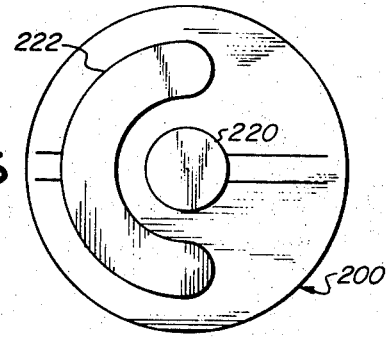
FIG. 6 is similar to FIG. 4 and shows still another electrode arrangement.

The two electrodes 220 and 222 might be shaped as circular areas as shown in FIG. 4, or they may be rectangular areas as in FIG. 5, or, as shown in FIG. 6, electrode 220 may be a circular area enclosed by electrode 222 in the form of a portion of a ring.

Figure 7:
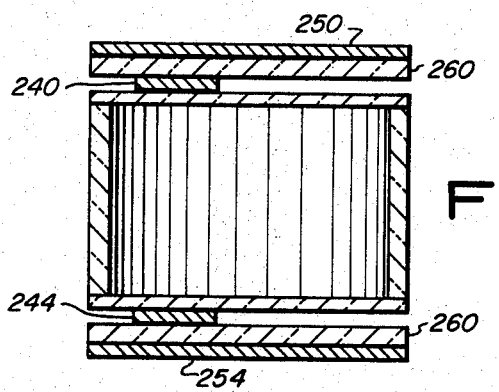
FIG. 7 is a sectional elevational view of still another modification of the invention.

In still another arrangement shown in FIG. 7, a cell 230 includes a small-area electrode 240 on one end wall and a second small-area electrode 244 on the opposite wall, and then large-area electrodes 250 and 254 are provided thereon with intervening insulating plates 260 between the electrodes. With this arrangement, various combinations of electrodes may be achieved. For example, electrodes 240 and 244 form one pair, and electrodes 250 and 254 form the second pair. The electrodes might also be paired 240 to 254 and 244 to 250 or 240 to 244 and 240 to 254 or 244 to 240 and 244 to 250.

What is claimed is:
1. A display device comprising
a glass cell filled with gas and having first and second glass end walls,
first and second relatively small-area electrodes secured to said first and second end walls respectively and aligned with each other whereby they may be used to apply a first potential across said gas,
a layer of insulating material covering said first and second electrodes, and
third and fourth relatively large-area electrodes secured respectively to said first and second end walls and usable to apply operating potential across said gas between them.
2. A display device and system comprising
an envelope filled with an ionizable gas,
said envelope having a glass side wall and first and second glass end walls, said end walls having inner surfaces inside said envelope in contact with said gas and outer surfaces outside said envelope and out of contact with said gas,
a first small-area electrode secured to said outer surface of said first end wall and a second small-area electrode secured to said outer surface of said second end wall,
said first and second electrodes being generally aligned with each other on an axis which is parallel to the axis of said envelope,
a first layer of insulating material on said first electrode,
a second layer of insulating material on said second electrode,
a third large-area electrode seated on said first layer of insulating material and extending beyond the area of said first electrode, and
a fourth large-area electrode seated on said second layer of insulating material and extending beyond the area of said second electrode so that it is in operative relation with said gas and the portion of said third electrode which extends beyond said first electrode,
said first and second electrodes being adapted to have a first firing signal source coupled between them to apply firing signals across said device in a limited area between them, firing of said device causing wall charges to form on the inner walls of said envelope, said wall charges being usable by a second signal source coupled between said third and fourth electrodes to fire said device in a limited space between them.
3. A display device and system comprising
an envelope filled with an ionizable gas which comprises about 94% neon and 6% nitrogen,
said envelope having a glass side wall and first and second glass end walls, said end walls having inner surfaces inside said envelope in contact with said gas and outer surfaces outside said envelope and out of contact with said gas,
a first electrode secured to said outer surface of said first end wall and a second electrode secured to said outer surface of said second end wall,
said first and second electrodes being generally aligned with each other,
a first firing signal source coupled between said first and second electrodes and adapted to apply firing signals across said device in a limited area between them, firing of said device causing wall charges to form on the inner walls of said envelope,
a sustaining signal source coupled between said first and second electrodes and adapted to apply spaced sustaining pulses of smaller amplitude than said firing signals across said device and adapted to sustain the first state of said device by utilizing said wall chargers,
a third electrode secured to said outer surface of said first end wall spaced from said first electrode and a fourth electrode secured to said outer surface of said second end wall spaced from said second electrode,
said third and fourth electrodes being generally aligned with each other, and
a second firing signal source coupled between said third and fourth electrodes and adapted to fire said cell in a limited area between them, said signal source providing signals having an amplitude smaller than the characteristic firing voltage of said cell and firing said portion of said cell by utilizing said wall charge generated by said first signal source.
4. The device defined in claim 3 wherein said first and second electrodes have a generally circular configuration and are spaced apart from each other.
5. The device defined in claim 3 wherein said first and second electrodes are generally rectangular and are oriented spaced apart parallel to each other.
6. The device defined in claim 3 wherein said first electrode has a generally circular configuration and said second electrode comprises a portion of a ring surrounding said first electrode.

References Cited
UNITED STATES PATENTS

| | | | |
|---|---|---|---|
| 2,624,858 | 1/1953 | Greenlee | 313—201 |
| 2,847,615 | 8/1958 | Englebart | 315—84.6 |
| 2,923,853 | 2/1960 | Englebart | 315—84.6 |
| 2,933,648 | 4/1960 | Bentley | 315—169 |
| 3,042,823 | 7/1962 | Willard | 315—84.6 X |
| 3,157,824 | 11/1964 | Jones | 315—169 |
| 3,198,980 | 8/1965 | Martin | 315—84.5 |
| 3,356,898 | 12/1967 | Dano | 315—297 |

BERNARD KONICK, Primary Examiner

J. F. BREIMAYER, Assistant Examiner

U.S. Cl. X.R.

315—84.5; 340—173